Figure 1:
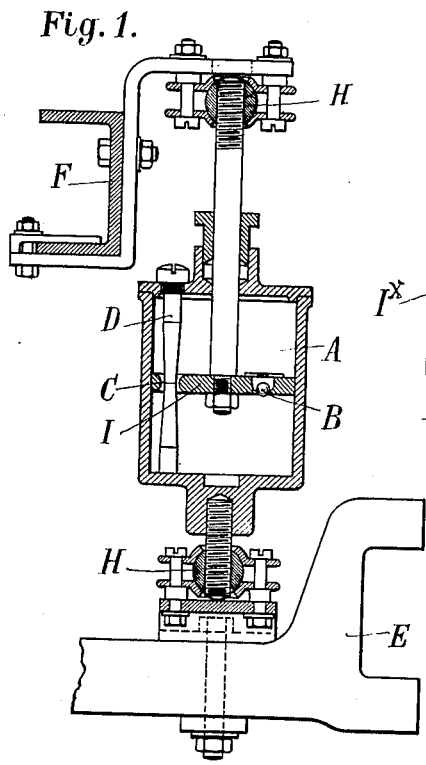

E. BATAULT & A. GARDY.
VEHICLE SUSPENSION.
APPLICATION FILED DEC. 4, 1905.

913,349.

Patented Feb. 23, 1909.

Witnesses
William W. Deane
R. C. Braddock

Inventors
Emile Batault and Auguste Gardy,
By
James Hamilton
their attorney

UNITED STATES PATENT OFFICE.

EMILE BATAULT AND AUGUSTE GARDY, OF GENEVA, SWITZERLAND.

VEHICLE SUSPENSION.

No. 913,349.

Specification of Letters Patent.

Patented Feb. 23, 1909.

Application filed December 4, 1905. Serial No. 290,124.

*To all whom it may concern:*

Be it known that we, EMILE BATAULT and AUGUSTE GARDY, citizens of the Republic of Switzerland, residing at Geneva, Switzerland, have invented certain new and useful Improvements in Vehicle Suspensions, of which the following is a specification.

The constantly increasing speeds used for road vehicles are, either on account of the defective condition of the roads or on account of the passage of the vehicle over a culvert or other obstruction, the source of jolts or shocks which are very disagreeable for the occupants of the car; and, moreover, these jolts or shocks result in a gradual change in the resiliency of the springs, and, sometimes, when the shocks are extremely violent, the springs are completely ruptured. The shocks above referred to are caused by not only the compression of the springs which result from the meeting of obstructions and the like but also by the sudden relief of the springs from the pressure upon them; which causes the springs to pass by their normal position of equilibrium to which they must ultimately return by a series of oscillations. To obviate the inconveniences resulting, several shock-deadening devices have already been proposed; and while these devices do in reality deaden the shocks, they do so under such conditions that the results are far from the best. Indeed, not only are the shocks imparted to the vehicle to be considered, but especially also the effect of these shocks upon the occupants of the vehicle.

The jolts resulting from the unevenness of the road cause the frame of the vehicle to vibrate up and down. When the frame is descending, the bodies of the occupants of the car descend with it; and when the frame reaches its lowest point, the inertia has no other effect than to depress the cushions, the resiliency of which serves to deaden the effect of the jolt by bringing the bodies to a gradual stop. But on the upward movement, that is, during the time the spring is expanding, the body of the occupant is not only raised to the limit of travel of the spring in its upward movement, but the body is projected still further and falls back upon the cushion, thereby giving the occupant a disagreeable jolt. Therefore, the body is given a movement the amplitude of which is greater than that of the movement of the springs during the ascending movement of the frame; and the shock imparted to the occupant is aggravated by reason of the fact that the frame is descending toward the point of rest, when the body of the occupant reaches the cushion. These ill effects rapidly increase with an increase in speed of the vehicle, and with the number of oscillations of the springs, which oscillations are an important factor since it is now the custom to provide the vehicle with springs of great flexibility. In the first place, it is obvious that if the flexibility of the springs is to be taken all possible advantage of, the small or slight oscillations must be damped very slightly, which may be done, since such vibrations are not of much moment; and, in the second place, it is of great importance to deaden the shocks caused by the oscillations of great amplitude. Yet the degree of deadening must not be the same in the case of the descending or downward movement of the frame of the vehicle as it is in the ascending or upward movement of the frame. The degree of deadening should be less in the former case than it is in the latter case; and in this way the full effect of the flexibility of the springs is made use of, while the oscillations are reduced in their most disagreeable portion.

It is obvious that, if the oscillations are damped or lessened not at all during the downward movement of the car, the energy stored up in the springs will be expended during the upward or return movement of the car. Therefore, it is necessary for the best results to oppose to the downward movement of the vehicle body some resistance in addition to the resistance derived from the tension of the springs. A greater resistance is opposed to the upward travel of the frame, so that it may not during this time sensibly overpass the normal rest position.

Figure 2:
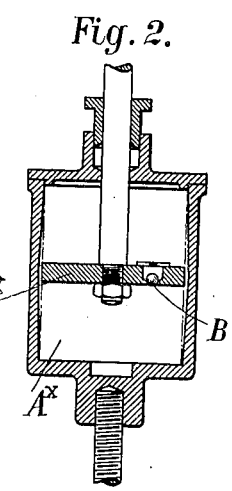
Figure 3:
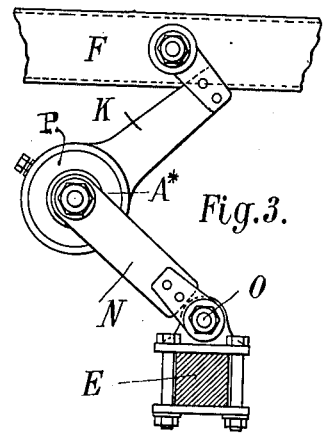
Figure 6:
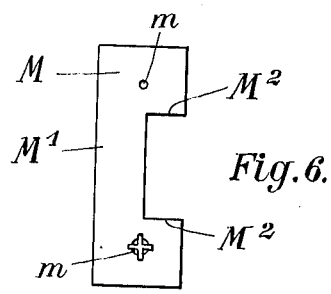
Figure 4:
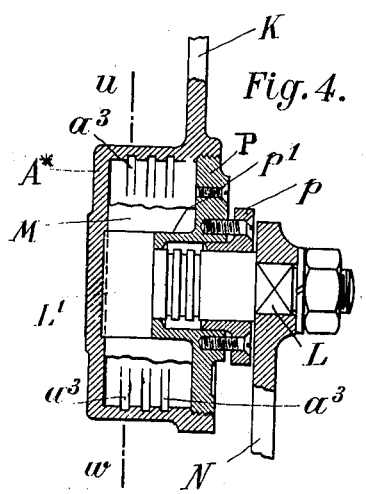
Figure 5:
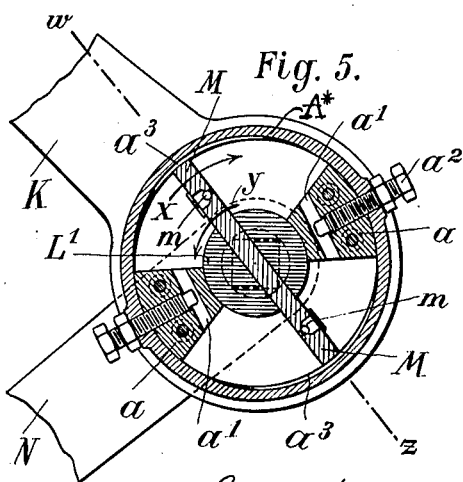

In the accompanying drawings, Figure 1 is a cross-section of so much of a car as is necessary to illustrate one form of construction of our device. Fig. 2 shows a modification of a portion of the construction shown in Fig. 1. Fig. 3 shows a longitudinal section of so much of a car as is necessary to illustrate another form of construction of our device. Fig. 4 is a sectional view on the line $w$—$z$ of Fig. 5 of the main portion of the device shown in Fig. 3 on an enlarged scale. Fig. 5 is a sectional view on the line $u$—$w$ of Fig. 4. Fig. 6 is a detail showing the rotary piston M.

In Fig. 1 the device consists of a cylinder A, filled with a liquid and secured by means of suitable sockets H, on the one hand to the axle E and on the other hand to the frame F of the car. In this said cylinder moves a piston I provided with one or more apertures C through each of which passes a rod D which is secured to one of the ends of the cylinder. The said rods vary in diameter at different points of their length; so that, according to the position of the piston, they close more or less the corresponding hole of the piston, thus rendering the passage of the liquid from one side of the piston to the other more or less difficult. It will be easily understood that, according to the said construction, the thinnest section of the rod D is within the aperture of the piston, when the same is in its normal position; and the liquid may easily pass through the said aperture under the pressure of the piston, and the springs of the car are entirely free; thus the greatest flexibility of suspension is obtained. If the oscillations become larger the aperture will be more and more narrow or contracted and the liquid opposes therefore an increasing resistance to the motion of the piston in the cylinder. This same result may also be obtained by means of the construction shown in Fig. 2; that is to say, by forming the inner walls of the cylinder $A^x$ of two conoidal portions with which co-acts a piston $I^x$, but this construction is not so practical as is the first one in which the rods D may easily be modified, either by reducing their section or by replacing the said rods by other ones, according to the weight of the car.

At B there is provided a valve which opens under the pressure of the liquid when the piston is descending, so that the said piston may easily descend to the bottom of its stroke, whenever a severe shock occurs. Therefore, the resiliency of the springs is made use of in this descending movement; but as soon as the said springs, after having been depressed, suddenly distend themselves, the valve B is shut and the liquid opposes such a great resistance that the ascending movement takes place slowly and without shock to the persons sitting in the car.

In the construction shown in the Figs. 3 to 6, E is the axle of the vehicle and F the frame of the same. $A^*$ is a cylinder filled up with liquid and pivotally connected by means of an arm K to the frame F. L is a shaft which traverses a stuffing-box $p$ of the cover P of the cylinder $A^*$ and which bears a rotative piston M located in the said cylinder $A^*$ and provided with valves $m$. The shaft L is connected by means of an arm N to the pivot O fixed on the axle E of the car. The shaft L is provided on its cylindrical portion $L^1$ with a transverse groove in which engages the central portion $M^1$ of the rotative piston M. This piston M is formed of a paddle of rectangular form the outer edges of which are adapted to fit in the cylinder $A^*$ and the edges $M^2$ of its central recess are designed to fit the portion $p^1$ of the stuffing-box $p$ which projects inside of the said cylinder. The inside of the cylinder $A^*$ is divided into two chambers of equal dimensions by means of two radial walls $a$ having each one or more apertures $a'$, each of which is combined with an adjusting screw $a^2$ by means of which the section of the aperture may be suitably controlled, according to the resistance which is desired to be opposed to the flowing of the liquid contained in the cylinder $A^*$ from one side of the stationary wall $a$ to the opposite side. Those portions of the inner walls of the cylinder $A^*$ which are situated between the stationary radial walls $a$ are provided with one or more eccentric grooves $a^3$ the deepest portion of which is placed in the middle of said portion of the walls of cylinder. These grooves $a^3$ are intended to allow the liquid contained in the cylinder to flow from one side of the rotative piston to the other and their eccentric form has for its object to cause this flow of the liquid to be rendered quite easy in the middle of the stroke of the piston and to oppose to the same an increasing resistance, in proportion as the rotative piston is progressing towards the end of its stroke in either direction. On account of the construction of the valves $m$ of the piston M the said flowing of the liquid from one side of the piston to the other one, will also take place through the said valves $m$ whenever the rotative piston is moved in the direction of the arrow $x$, but it does not take place when the said piston is moved in the direction of the arrow $y$.

The device is constructed and mounted so as to have the rotative piston M moved in the direction of the arrow $x$ whenever the frame F is moved downward and to have the said piston moved in the direction of the arrow $y$, whenever the frame F is rising. Therefore, the upward movement of the frame will be resisted with greater intensity than its downward movement.

It is to be well understood that the invention claimed is not limited to the constructions as shown and described above.

The arrangement of the parts of the device described with reference to Fig. 1 may of course be inverted, the cylinder A being connected to the frame F and the piston C to the axle E. But then the valve B must still be arranged to open as shown in Fig. 1.

The liquid contained in the cylinder A may be replaced by a semi-liquid or semi-fluid material as for instance fat or a mixture of fat with other materials. Especially good results have been obtained by a paste formed of a mixture of fat and of pulverized graphite.

We claim:

1. In combination in a road vehicle, a vehicle frame; a vehicle axle; a cylinder secured to one of said members and filled with a fluid; a piston secured to the other of said members and mounted in said cylinder; said cylinder being provided with a wall the thickness of which increases in both directions from the normal rest position of said piston; and said piston being provided with a valve which opens when the piston moves in one direction and closes when the piston moves in the opposite direction.

2. In combination in a road vehicle, a vehicle frame; a vehicle axle; a cylinder secured to one of said members and filled with a fluid; a piston secured to the other of said members and mounted free to rotate in said cylinder; said cylinder being provided with a wall the thickness of which increases in both directions from the normal rest position of said piston; and said piston being provided with a valve which opens when said piston moves in one direction and closes when said piston moves in the opposite direction.

3. The combination in a road vehicle of a vehicle frame; an axle supporting the same; and a shock-deadening device interposed between said frame and axle; said device comprising a casing member filled with a fluid and a piston member in said casing and movable relatively thereto; one of said members being connected to said frame and the other of said members being connected to said axle; said casing being provided with inwardly-extending projections formed with passages and with means for opening and closing the same; and with walls which increase in thickness on both sides of the rest position of said piston; the latter being provided with a valve which opens when the piston moves in one direction and closes when the piston moves in the opposite direction.

4. In shock-deadening apparatus, the combination with vehicle springs, of a vehicle frame fastened thereto; a cylinder filled with fluid; a piston in said cylinder, the relative movement of said piston and cylinder being controlled by the movement of said frame; means for opposing resistance to the flow of said fluid from one side of said piston to the other, said resistance increasing with the extent of the relative movement between said piston and cylinder from the normal rest position of the same; and means for increasing the resistance-opposing effect of the first-named means at any given point of said frame's upward travel over the same effect at the same point during the said frame's downward travel; the resistance-opposing effect of the first-named means being slight at and about the normal rest position of said piston, cylinder and frame.

5. The combination of a cylindrical casing containing liquid and having a partition across the same, provided with openings therethrough and screws for adjusting the size of said openings, and an axial turning pin in the casing, having wings extending radially therein on both sides of the partition.

In testimony whereof we have affixed our signatures in presence of two witnesses.

EMILE BATAULT.
AUGUSTE GARDY.

Witnesses:
L. H. MUNIER,
EMIL SCHMIDT.